United States Patent
Priyadarshi et al.

(10) Patent No.: US 8,391,708 B1
(45) Date of Patent: Mar. 5, 2013

(54) LASER EYE SAFETY AND FIBER RECEPTACLE PRESENCE DETECTION

(75) Inventors: Sunil Priyadarshi, Sunnyvale, CA (US); Joshua John Edward Moore, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 742 days.

(21) Appl. No.: 12/172,064

(22) Filed: Jul. 11, 2008

(51) Int. Cl.
  *G02B 6/36* (2006.01)
  *G02B 6/42* (2006.01)

(52) U.S. Cl. ............. 398/15; 398/9; 398/1; 398/25; 385/72; 385/76; 385/88; 385/75; 385/78

(58) Field of Classification Search ............. 398/15, 398/9
See application file for complete search history.

(56) References Cited

U.S. PATENT DOCUMENTS

| | | | |
|---|---|---|---|
| 5,229,593 A | | 7/1993 | Cato |
| 5,831,959 A | * | 11/1998 | Sakanushi ............. 369/116 |
| 7,346,278 B2 | | 3/2008 | Aronson et al. |
| 2002/0159715 A1 | * | 10/2002 | Kimura et al. ............. 385/75 |
| 2005/0185898 A1 | * | 8/2005 | Stewart ............. 385/92 |
| 2006/0008276 A1 | * | 1/2006 | Sakai et al. ............. 398/141 |
| 2007/0071048 A1 | * | 3/2007 | Anderson et al. ......... 372/38.02 |
| 2007/0116076 A1 | * | 5/2007 | Wang et al. ............. 372/38.07 |

* cited by examiner

*Primary Examiner* — Shi K Li
*Assistant Examiner* — Oommen Jacob
(74) *Attorney, Agent, or Firm* — Wyatt, Tarrant & Combs, LLP; William S. Parks

(57) ABSTRACT

Provided herein is a novel approach to simultaneous fiber presence detection and improved laser eye safety of an optical transceiver. The subject optical transceiver is fitted with at least one switch in its receptacle that controls the laser diode and indicates the presence of a fiber (or fibers) within such a receptacle. If a fiber is present within the subject module receptacle, the laser switch is permitted to be "on", whereas the absence of a fiber will prevent the laser switch from turning on, thereby permitting effective control of the laser at a single point of failure within the entire optical transceiver system. The typical optical transceivers of today exhibit limited optical power output due to eye safety limit criteria. With this novel approach, however, a module's output power can be increased to higher level since the only way a person's eye may be exposed to the laser is the removal of the fiber receptacle from the subject module and once the fiber is absent from the module, the laser turns off and/or put optical transceiver into standby mode automatically to save power.

6 Claims, 9 Drawing Sheets

LASER EYE SAFETY AND FIBER RECEPTACLE PRESENCE DETECTION

FIELD OF THE INVENTION

Provided herein is a novel approach to simultaneous fiber presence detection and improved laser eye safety of an optical transceiver. The subject optical transceiver is fitted with at least one switch in its receptacle that controls the laser diode and indicates the presence of a fiber (or fibers) within such a receptacle. If a fiber is present within the subject module receptacle, the laser is permitted to be "on", whereas the absence of a fiber will prevent the laser from turning on, thereby permitting effective control of the laser within the entire optical transceiver system. The typical optical transceivers of today exhibit limited optical power output due to eye safety limit criteria. With this novel approach, however, a module's output power can be increased to a higher level since the laser is on when coupled to a fiber and once the fiber is absent from the module, the laser turns off (or transfers to a standby mode) automatically.

BACKGROUND OF THE INVENTION

Transceivers are used frequently within communications equipment to transfer information, generally through the conversion of electrical impulses to light impulses and vice-versa. Lasers and photodetectors permit such conversions within transceivers. Unfortunately, the distance such information can be transported is limited by the output optical power of the laser, the non-linearity effects of fiber (dispersions), and other limitations of the receiver.

As the optical communications network employs such a transceiver (or a plurality of transceivers) as a mechanism for data transfer, it is important that the laser output present no health hazard to bystanders. For example, if the optical cable were to become unplugged, the laser output would no longer be contained and may be freely emitted into the environment. It is possible that the emitted laser output may be received by a human eye, and if the intensity of the laser output is too high, harm could occur. Accordingly, for safety purposes, the optical intensity of the laser is kept low such that eye safety is assured should the optical cable become unplugged. Conventional optical transceivers thus have eye safety mechanisms, such as laser bias monitors, for example, that shut down the optical transceiver should the optical power become too large.

Typically, then, past configurations of such optical transceivers were subject to electrically controlled eye safety implementations (such as through the utilization of either hardware or firmware) and all possible single point failure conditions that can cause unsafe levels of laser power were initially identified. It was imperative that, if a single point of failure existed, any such eye safety protocols demonstrate compensation for any such single point failure by either turning the laser off or by limiting the laser optical output power. More important, however, was to avoid any devices that exhibited potential single-point failures. Even in such situations, it was necessary to provide effective protections from eye injuries were the laser portion to become compromised, regardless of the number of failures points present.

It is thus a requirement that such optical transceivers be eye-safety compliant, particularly in the case of not having a single point failure within the transceiver itself. Currently, however, the best methods of controlling any such single- or multiple-point problems also require lower laser power levels to be initially utilized; nothing has been provided within the optical transceiver industry that allows for instantaneous shut-off upon of a laser upon exposure of the laser diode itself to an area outside the transceiver module. Double fault conditions are now primarily utilized and generally followed to prevent any single failure point. With such a double-point failure protocol, at least it has become easier to prevent the subject laser power from reaching unsafe open bore levels upon decoupling from the transmitter port.

This eye-safety problem basically concerns the possibility that the subject laser cannot be deactivated quickly during a fault condition, a system failure, laser or transceiver replacement, or other like activity. To combat such a potential occurrence, the usual reply within the industry has been, as noted above, to decrease laser strength (to lessen the potential eye damage) or to include an entire shut off of the processor in response to changes in the integrity of the system itself, as well as the possibilities mentioned above about optical intensity thresholds. Such remedies have proven uneven at best; reducing initial laser strength in turn decreases transmission distance and hence makes optical networks more complex and costly. Thus, it has been an aim within this industry to provide a manner of increasing laser strength while best ensuring that eye safety is itself not compromised with such an increase in laser strength.

Furthermore, the best remedy for such a problem should take into account the necessity of a separate, independent capability of controlling the power relayed to the subject laser during any type of failure. The previous protocols have not implemented any such possible method or manner. As such, to date, the communications industry has been limited in laser power utilization in order to provide effective and reliable eye-safety mechanisms for potential system breaches or failures. No acceptable previous developments have been accorded the industry to aid in this deficiency.

BRIEF DESCRIPTION AND ADVANTAGES OF THE INVENTION

A distinct advantage of the present novel manner of ensuring eye safety in such systems is the utilization of a switch to detect fiber insertion to enable the maximum laser power to be set at the coupled limit which is higher than the open bore laser eye safety limit. Another advantage related to such a maximum laser power is that such a system capability improves laser yield and helps to meet data transmission specifications. Yet another advantage of this novel configuration is the capacity for complete shutdown of the laser component upon disconnection of the optical transceiver through two separate switches, rather than a single switch (thereby best ensuring safety protocols are met for laser eye safety upon a multiple point failure within the optical transceiver). Another advantage of such a control mechanism is the capability of increasing the laser power to a high intensity with the reliability of instantaneous shutdown thereof if the system is compromised and the laser beam, in essence, is potentially external to the subject optical transceiver itself. Another advantage of this novel fiber detection is that a module can power down or run in a standby mode to conserve power when an optical fiber is not inserted and the module is not required to transmit data.

Accordingly, this invention encompasses a laser shutdown control mechanism within an optical transceiver having two distinct ports, a first laser port and a second photodetector port, the mechanism comprising at least one optical fiber receptacle present within either of said first laser port or said second photodetector port and at least one optical fiber for introduction within said at least one optical fiber receptacle, either or both of said first laser port and said second photodetector port is connected to a microprocessor or circuit, wherein upon introduction of said at least one optical fiber within said at least one optical fiber receptacle said microprocessor or circuit relays a signal to said laser to be turned in the "on" position, and wherein upon disengagement of said at least one optical fiber from said at least one optical fiber receptacle, said microprocessor relays a signal to said laser to be turned in the "off" or "standby mode" position (such "standby mode" basically allows for powering down the transceiver in order to save power consumption). The method of controlling a laser shutdown through detection of the optical fiber component as described above is also encompassed within this invention.

Fiber optic technology is increasingly employed as a method by which information can be reliably transmitted via a communications network. Optical communications networks employ optical transceivers in transmitting information via the network from a transmission node to a reception node. An optical transceiver at the transmission node receives an electrical signal from a network device, such as a computer, and converts the electrical signal via a laser to an optical signal. The optical signal can then be emitted by the transceiver and transmitted in a fiber optic cable via the optical network. The optical signal is then received by a reception node of the network. Once received by the reception node, the optical signal is fed to another optical transceiver for conversion via a photodetector into electrical signals for forwarding or further processing.

As noted above, such systems utilize lasers to effectively transfer information via optical signals. As such, contemporary laser configurations exhibit power emissions that are attenuated to a low level to stay below eye safety limits. Such low levels, however, impact a number of issues, primarily those pertaining to generally lower in strength from performance specifications due to potential eye damage issues. Such lower strength lasers have proven difficult in terms of signal distances and laser yields. The ability to potentially utilize higher power laser devices within such optical transceivers helps to overcome these deficiencies. Performance specifications generally require a minimum laser power to be provided within the communications system; however, there is a tradeoff in that the contemporary (i.e., typical) systems must meet these eye safety limits simultaneously, thereby leading to a maximum usable laser power level that generally resides at a level moderately higher than customer performance specifications require. This leaves a small window for laser yields that must be above customer specifications but below laser eye power levels. The present invention advantageously permits an increase in the upper power limit of the laser through the utilization of a mechanical switch (or switches) in tandem with the insertion of an optical fiber into its proper receptacle within the optical transceiver. In this manner, a larger power window is made available (contrary to the typical transceivers in use today) whereby the laser yield is improved, the available distance of the signal is maximized, and the customer performance specifications can best be met.

In the present invention, it has been determined that reliable eye safety mechanisms can be employed through the utilization of a rather simple, yet elegant single or dual switch mechanism in tandem with an optical fiber and optical fiber receptacle within the subject optical transceiver apparatus. Connecting the fiber receptacle to a microprocessor, which in turn is connected to the target laser, permits a control mechanism for laser shutdown (either total shutdown or "standby mode") that has heretofore not been employed within the optical communications industry.

The ability to provide instantaneous shutdown of the subject laser thus provides a highly effective safety protocol. As mentioned previously, past attempts at ensuring laser eye safety concentrated on the intensity of the laser signal by keeping the pertinent laser power below potentially harmful levels. Of course, such an alternative reduced the laser strength to levels that were undesirable as information transfer distance was compromised. In the current development, the laser can be operated at a higher coupled eye safety limit as any disconnection between the optical fiber and the optical fiber receptacle will instantaneously send a signal to the integrated microprocessor to, in turn, instantaneously shutdown the target laser. Thus, no exposure to a high intensity laser beam could occur.

The target optical transceiver is described in greater detail below. However, it is expected that the subject optical transceiver(s) of this invention will comprise at least two connection pieces, the transceiver module itself containing the transmitting laser and receiving photodiode and the novel switch, as well as an optical connector containing the optical fiber used for the transmission of light impulses. When the optical connector is inserted into the transmitter or receiver ports the switch in the port is triggered and signals that a fiber is connected thereto. The transceiver is then able to activate the laser at the higher coupled eye safety power limit and also come out of standby or power saving mode. The microprocessor thus connects to the receptacle and is configured in such a fashion as to control the laser bias path; the presence of the fiber allows for the switch to the laser bias path to be in place, while the absence thereof the fiber breaks the laser bias path and switches it off. The switch in this embodiment is fitted with two contacts to act as a double fault system as well, if desired.

Furthermore, a switch may also optionally be included on the receiving portion (e.g., the photodetector port) of the subject optical transceiver instead of only on the transmitting portion (e.g., the laser port) thereof, or on just the receiving portion of the optical transceiver itself. Such a configuration allows for monitoring of the transmitting fiber and receiving fiber connections independently. In each scenario, a double fault switch with multiple contacts allows for better control against single point failures. If one contact in a switch is accidentally jammed in the "on" position, the second contact will function normally and prevent the high power laser from turning on when no fiber is present. In essence, the laser may be turned "on" or "off" (or placed in standby mode) due to two independent switches, rather than just one, to compensate for this potential occurrence.

Benefits of this invention are higher yields on lasers because the operational power window is opened up. Currently, the minimum power is set by the transmission and receiving specifications and the maximum power is set by an open bore laser eye safety limit. The utilization of a fiber detection switch allows the upper power limit to be increased to a coupled laser eye safety limit. Such a configuration allows for higher yields on lasers and ultimately other potential costs. Likewise, a fiber detection switch would allow modules to detect whether they were being used or not and go into a standby or power reduced mode. Once a fiber is inserted within its target, the module would switch into normal operating mode. This feature would conserve power which reduces energy and cooling costs, too.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE DRAWINGS AND PREFERRED EMBODIMENTS

Figure 1:
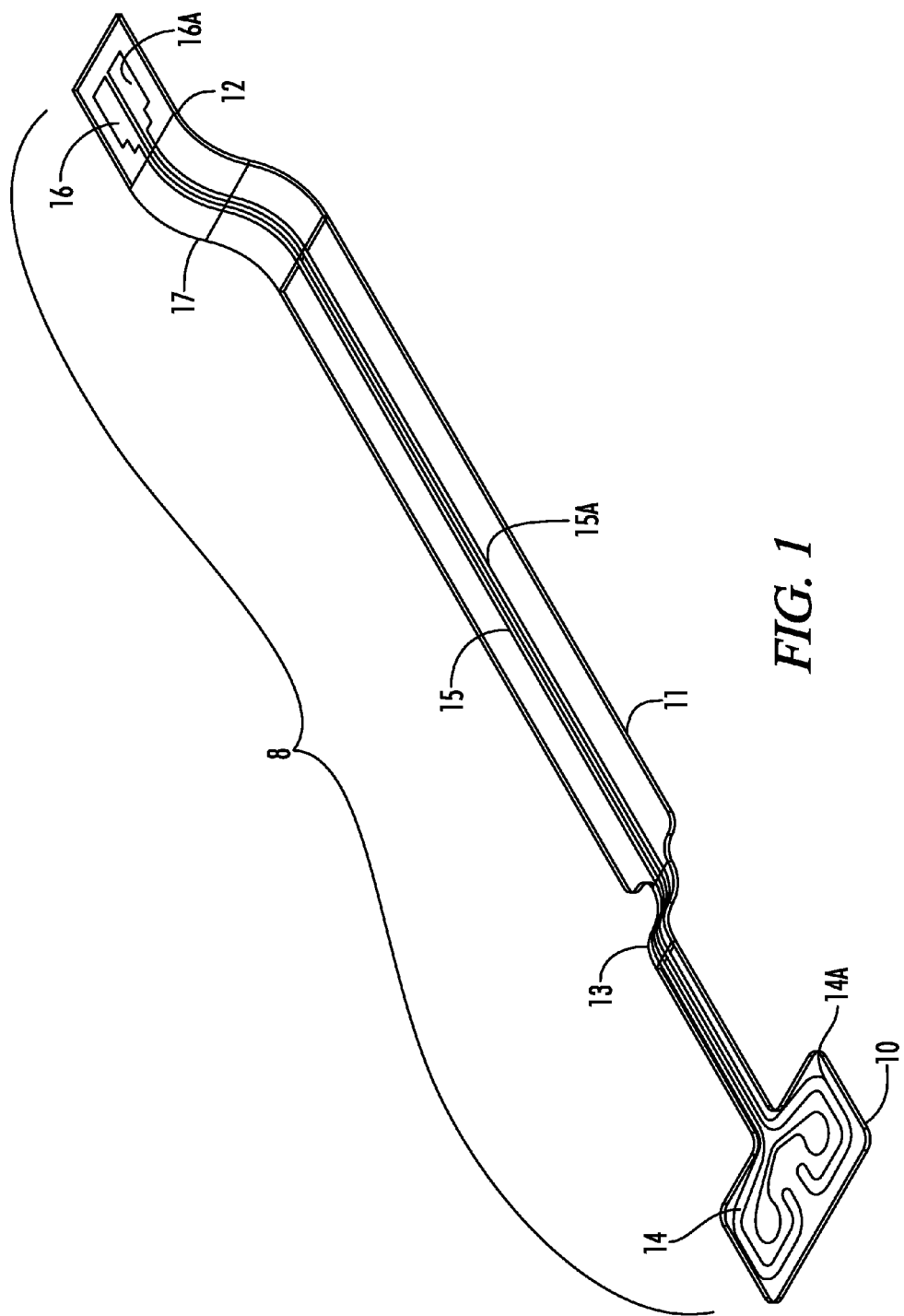
FIG. 1 depicts a broad view of a circuit that serves as the control of the on/off signal for a laser within the subject optical transceiver.

Turning to the drawings, FIG. 1 a circuit 8 is provided that can be constructed of any typical polymeric matrix (such as polyimide, polyacrylate, polycarbonate, etc., and the like) with a first end 10 and second end 12 and a bridge portion 11. Embedded within the matrix are two separate metallic strands with first ends 14, 14A, second ends 16, 16A, and bridge portions 15, 15A. The metallic strands permit electronic impulses to be transferred from the first ends 14, 14A to the second ends 16, 16A, and, with a proper connection (such as the springs 120, 120A of FIG. 2) the circuit can be complete. The bridge portion 11 of the circuit 8 is located on a plane lower than the first and second ends 10, 12, through a first bend 13 and second bend 17 in the circuit 8. In this manner, the circuit 8 may be placed into an optical transceiver (such as in FIG. 9) with the circuit itself lying flat or recessed therein to prevent any obstacle to the other components of the transceiver from situating and/or functioning properly.

Figure 2:
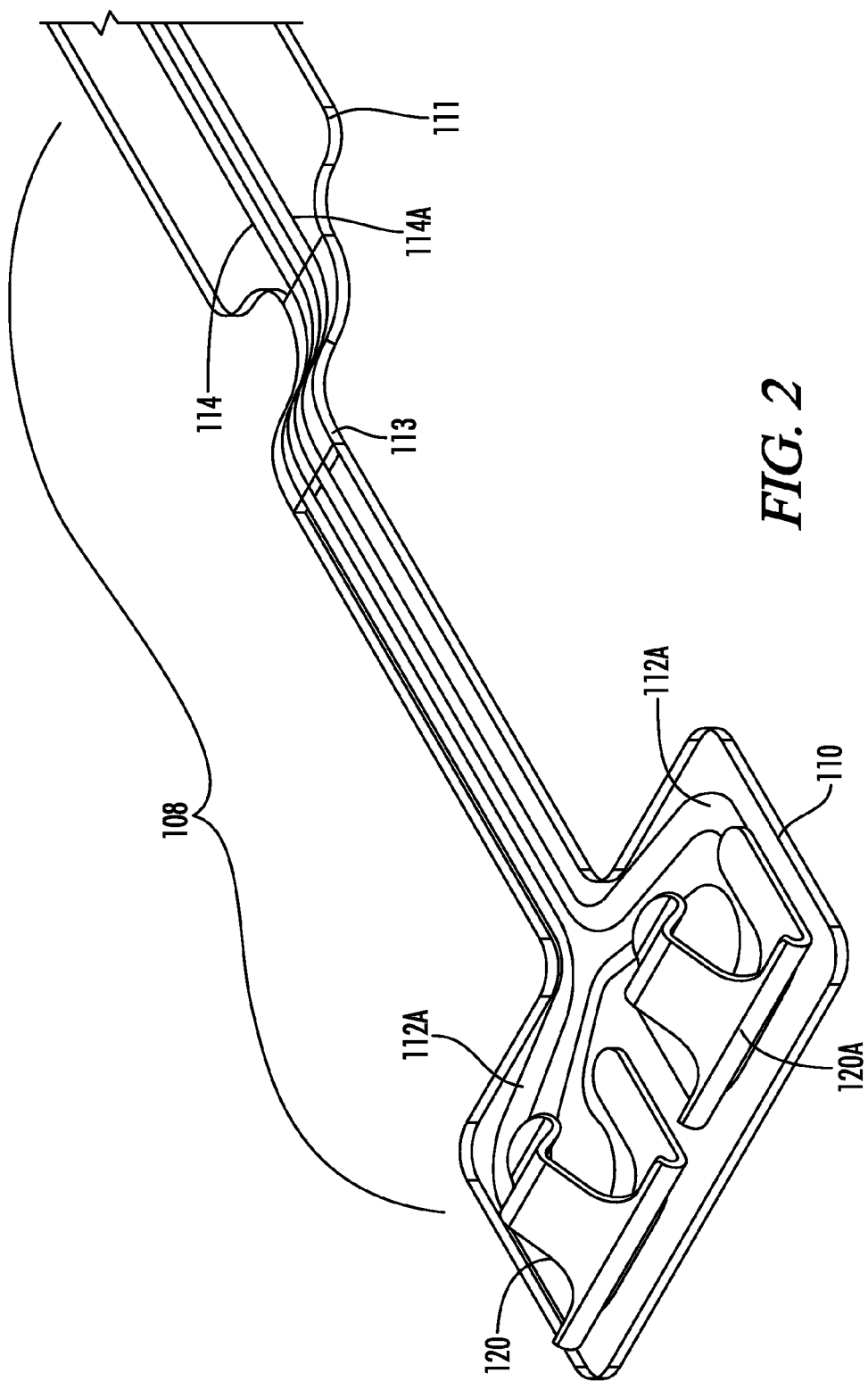
FIG. 2 shows the same circuit as above in close-up view with spring switches in place.

FIG. 2 thus provides a further presentation of the circuit 108 with spring connectors 120, 120A included thereon on the first end 110 and in connection with the first ends of the metallic strands 112, 112A. As in FIG. 1, above, the metallic strands include bridge portions 114, 114A embedded within the bridge portion of the circuit 111 (within a polymeric matrix), wherein the bridge portion 111 is located on a lower plane than the first end 110 in relation to a bend 113 within the circuit 108 itself. Upon proper contact with an optical connector, the spring connectors 120, 120A, deflect and close the electrical circuit 8.

Figure 3:
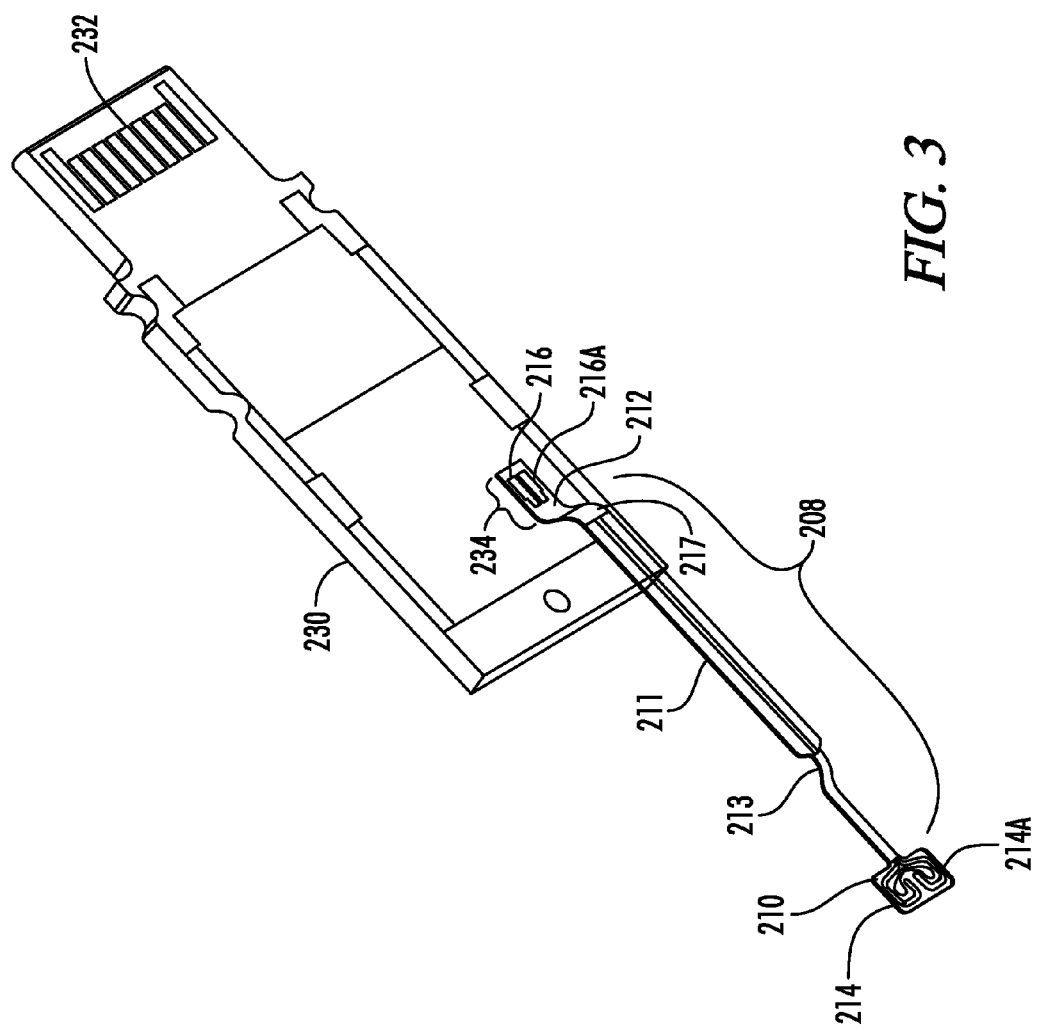
FIG. 3 depicts a view of the bottom of the circuit as attached to a microprocessor.

The circuit 208 in FIG. 3 is thus connected to a microprocessor 230 with its own connectors 232 for transfer of signals to a separate component (not illustrated). The circuit 208 is connected to the microprocessor 230 at an interface 234 that permits electrical impulses to be transferred thereto. As in FIGS. 1 and 2, the circuit 208 included a first polymeric matrix and 210, a bridge portion 211, a second end 216 and two bends 213, 217 to place the bridge portion 211 in a lower plane than the first and second ends 210, 212. Within the matrix are the two metallic strands with first ends 214, 214A and second ends 216, 216A. This configuration allows for the microprocessor 230 to send and receive electrical impulses through the circuit 208 only when an optical connector is inserted and the switch contacts are depressed closing the circuit.

Figure 4:
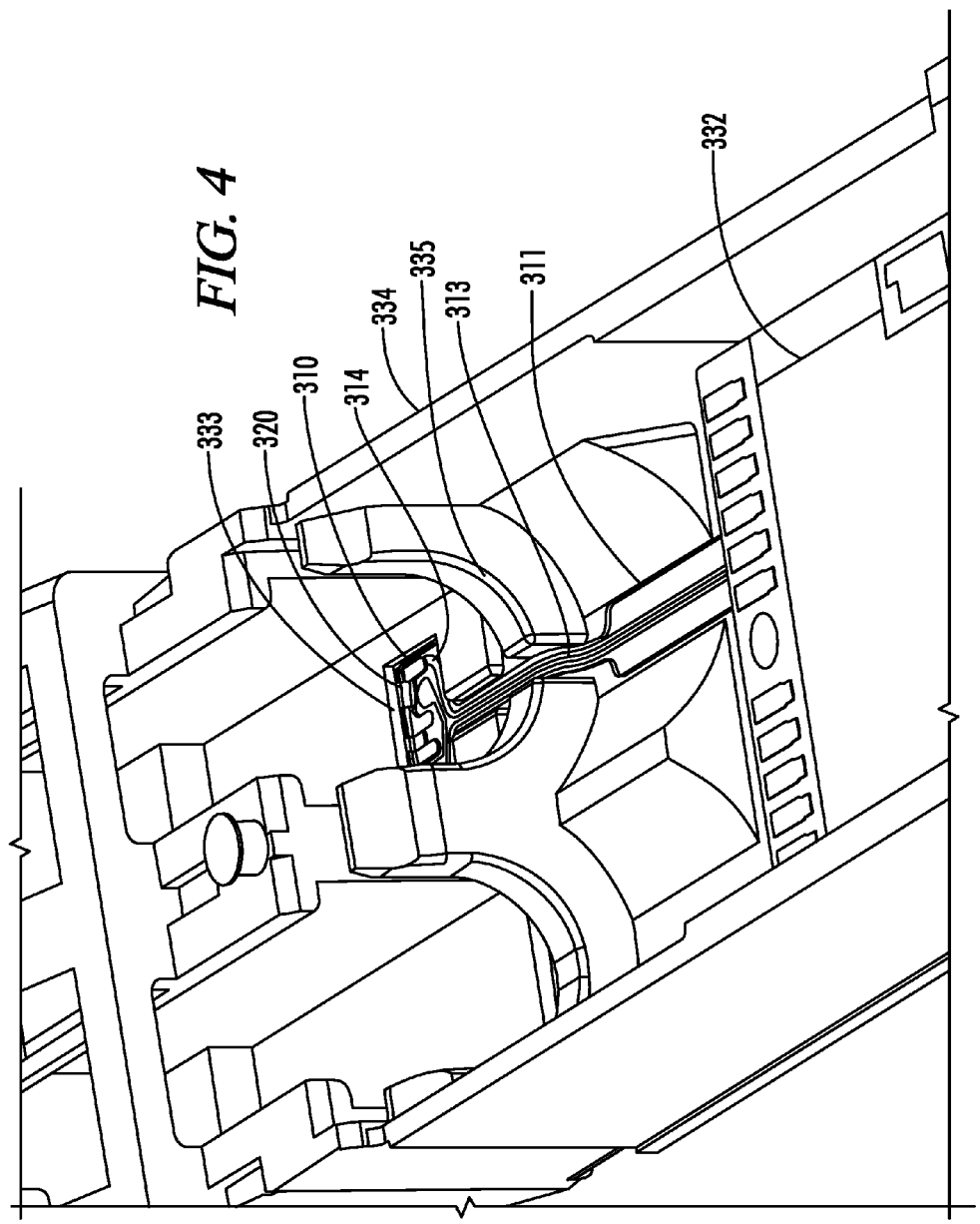
FIG. 4 provides a partially elevated partial view of the circuit and microprocessor as situated in an optical transceiver prior to connection between the two transceiver components.

FIG. 4 shows the in-laid circuit within a recessed portion 333 of an optical transceiver device 334. A spring connector 320 is shown (the other is obscured, but is still present) on the first end of the circuit 310 with a first metallic strand 314 embedded therein. The first bend in the circuit 313 is viewable and provides the needed recessed placement of the bridge portion 311 of the circuit within the lowest portion of the internal area within the optical transceiver 334. At the first bend 313, a U-shaped port 335 is in place for eventual placement of a laser generator (436 in FIG. 5). The microprocessor 332 is attached to the circuit within the optical transceiver 334 as well. This microprocessor 332 (alternatively it may be a circuit) may also be connected through at least one sensor device (such as a switch or proximity sensor, a touch sensor, a pressure sensor, a light sensor, and the like).

Figure 5:
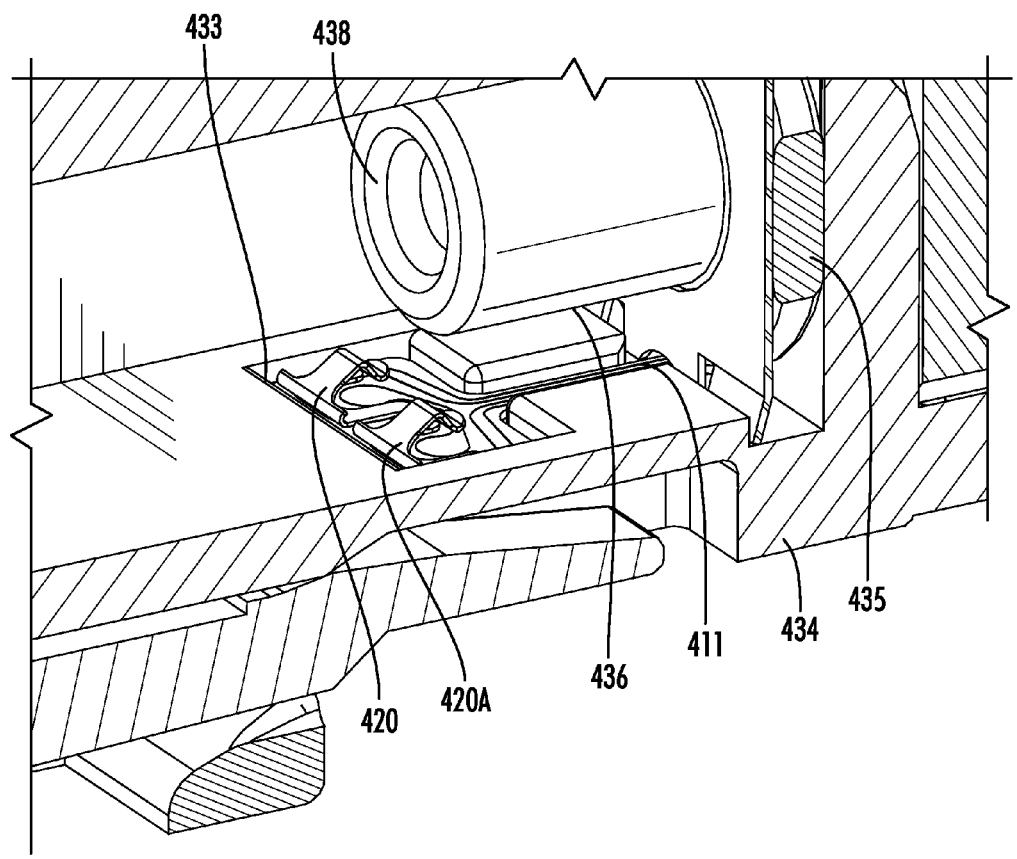
FIG. 5 provides a side view of the close-up view of circuit in place within an optical transceiver prior to connection between the two transceiver components.
Figure 6:
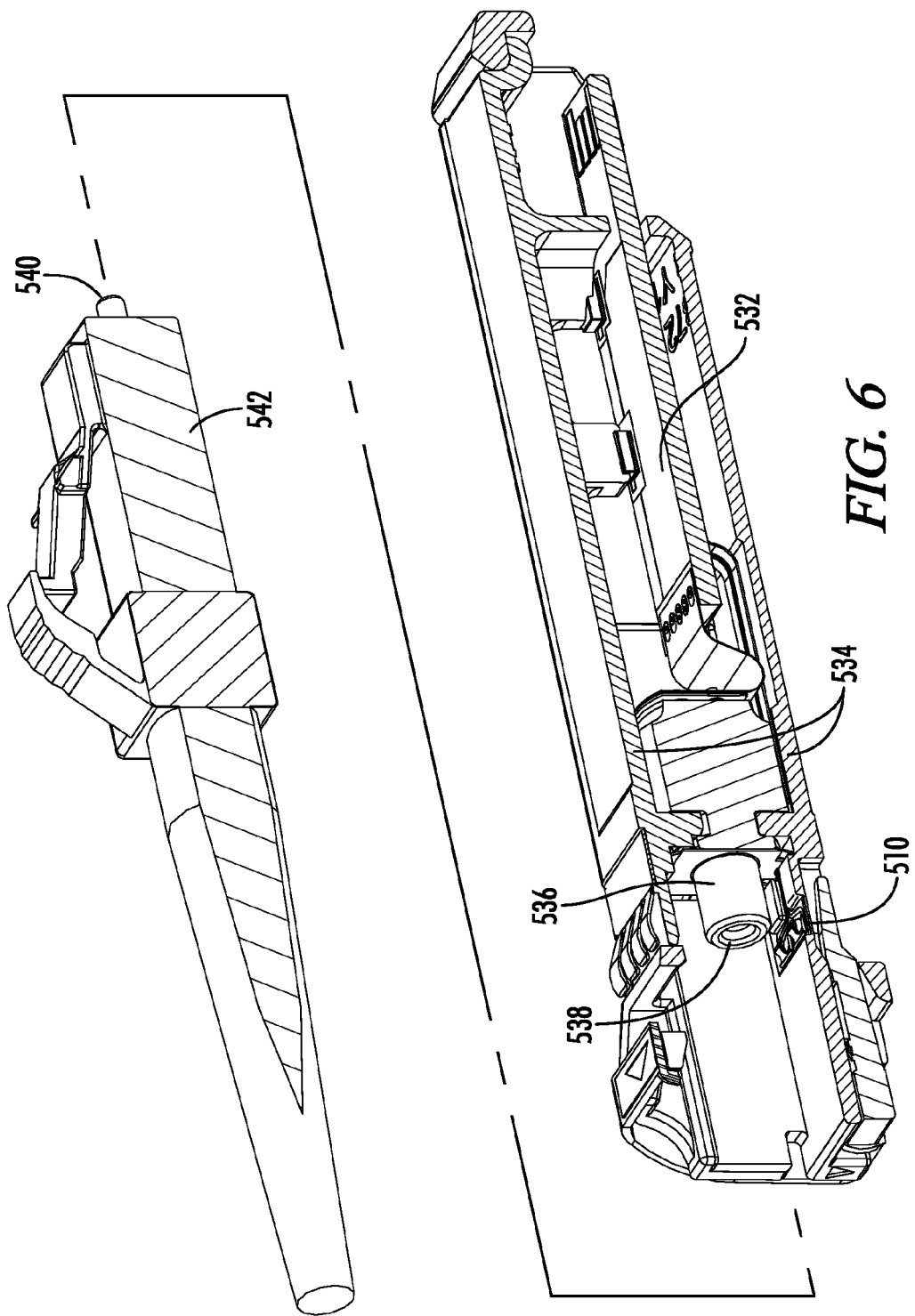
FIG. 6 depicts the separated components of an optical transceiver in side view.
Figure 7:
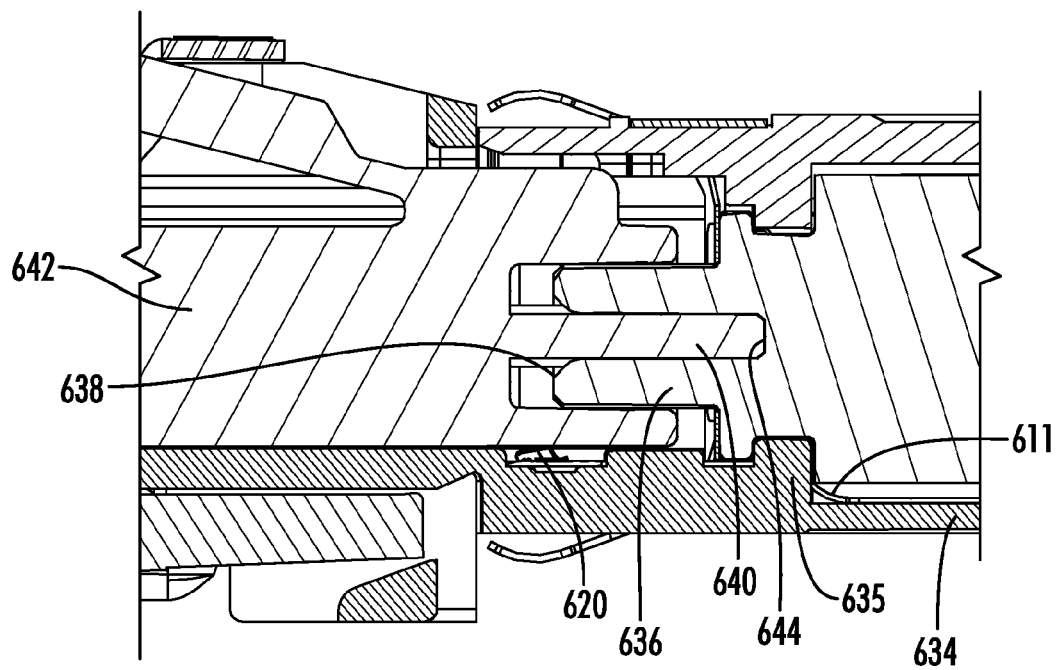
FIG. 7 provides a cross-sectional view of the optical transceiver upon connection of the two components.

In FIG. 5, the laser 436 is included within the U-shaped post 435 of the optical transceiver 434, with the laser aperture (port) 438 located just above the spring connectors 420, 420A of the circuit. The circuit is within the transceiver recess 433. In this configuration, upon introduction of the first section of the optical connector (542 in FIG. 6; fully depicted in FIG. 7), the circuit is completed and the microprocessor (332 in FIG. 4, for example) controls the laser 436. FIG. 6 provides an initial view of the pre-connected first and second portions of the connector 542 and transceiver 534, including the optical fiber 540 that is to be connected with the laser 536 to permit transfer of optical impulses thereby through the laser aperture (port) 538. The circuit 510 is present below the laser 536 and its aperture (port) 538 (i.e., the fiber receptacle). Upon connection of the fiber 540 within the laser aperture (port) 538, the circuit is complete and the laser 536 is permitted to turn on through the microprocessor 532 connected to the circuit 510. The completed connection of the optical connector 642 and transceiver 634 are shown in FIG. 7. The spring connectors 620 (the other is obscured by the first) are forced downward by the connector portion 642 which houses a photodetector (not illustrated) connected to the optical fiber 640, upon introduction of the optical fiber 640 within the laser aperture (port) 638 and thus within the laser portion 636 that is situated within the U-shaped port 635 of the transceiver module 635. The interface of the fiber and laser 644 is the point where transfer of optical impulses occurs further transmitted to a photodetector (not illustrated) within the optical connector 642. If the optical connector 642 is disconnected from the transceiver module 634 (and thus the optical fiber 640 is removed from the laser aperture, or port 638) the spring connectors 620 instantaneously raise up thus opening the circuit connection and thus discontinuing transfer of electrical impulses to the microprocessor (532 in FIG. 6), ultimately instantaneous, or at least simultaneously turning the controlled laser 636 off as well. The metallic strands 14, 15, 16, 14A, 15A, 16A in FIG. 1, for example) of the circuit may be any conductive metal, although copper is preferred. The connector 642 may be of any suitable material, although polymeric materials are preferred that are rigid in nature. Polyolefins, polyurethanes, and the like, may be utilized for this purpose, as merely examples. Transceiver module 634 may be of any suitable material, although zinc or aluminum die cast or zinc components that can house electronic and optical devices therein (i.e., exhibit proper dielectric constants) are preferred.

Figure 8:
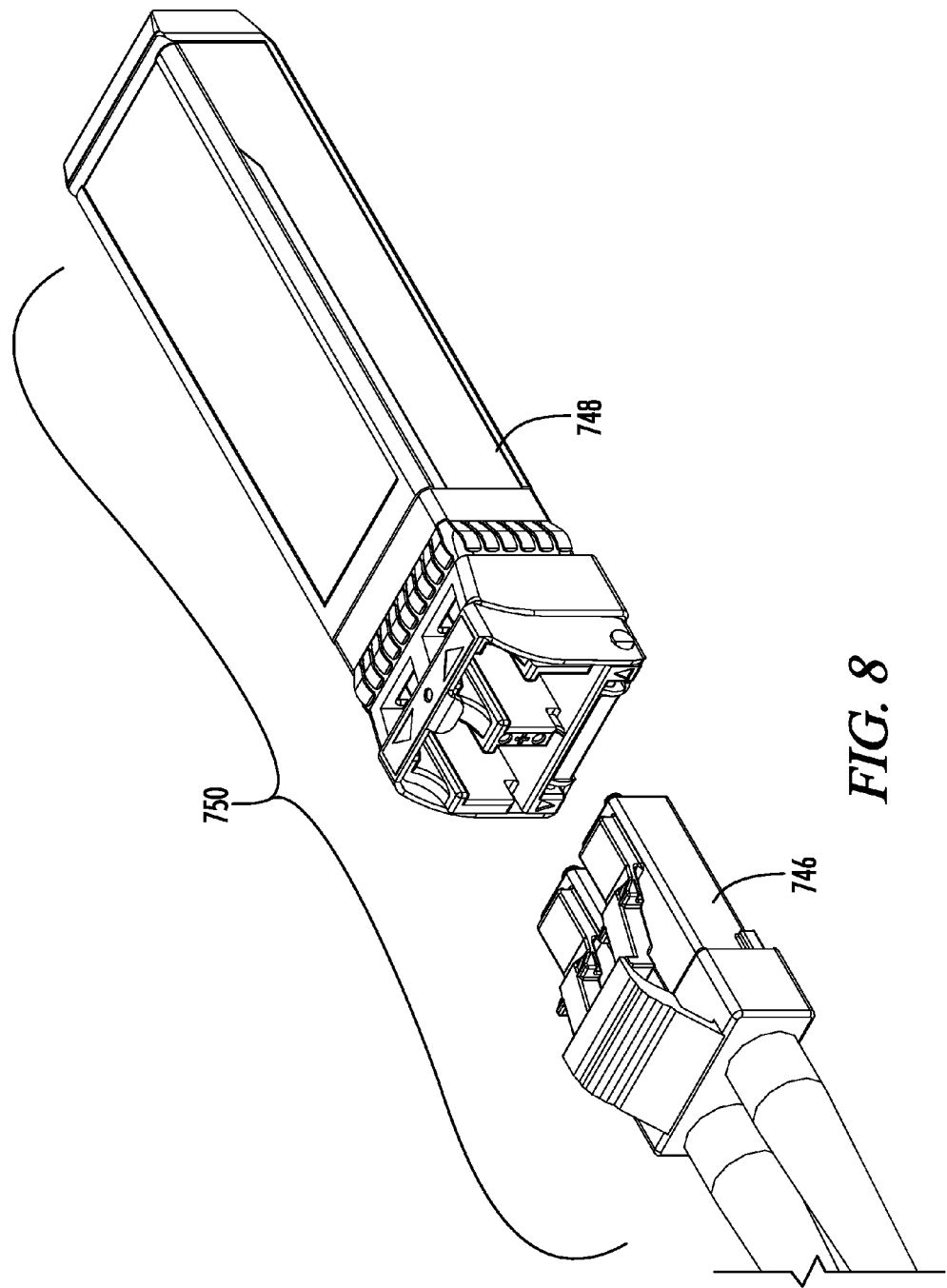
FIG. 8 provides a different optical transceiver encompassing that would include the circuit in partially elevated view with the two components separated.
Figure 9:
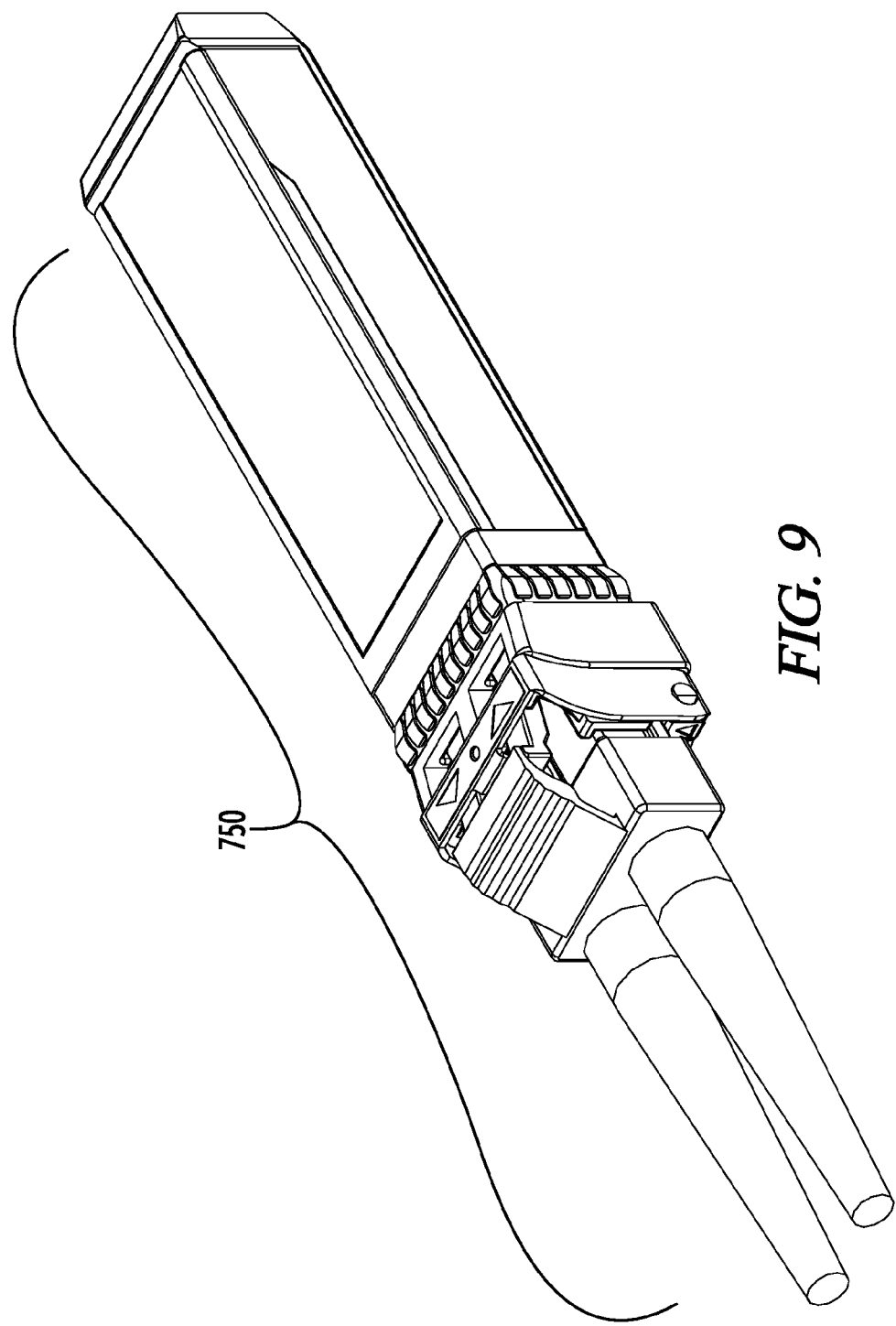
FIG. 9 shows the FIG. 8 optical transceiver in partially elevated view in connected state.

In FIG. 9, the optical transceiver 750 is connected to an optical connector whereas in FIG. 8, the transceiver is separated from the connector. This separation prevents, automatically and nearly instantaneously, the laser (636 of FIG. 7, for example) from turning on. In such a way, a user can safely disengage an optical transceiver without fear of eye damage due to the laser present therein.

Additionally, through the utilization of such an optical transceiver and laser control mechanism, a high laser intensity signal may be employed to increase optical signal transmission distance. Such a system has heretofore been unavailable without potentially comprising laser eye safety for a user. Hence, the novel approach delineated here permits a further benefit in that potentially greater information transfer distances may be undertaken within subject optical communication systems as well. Likewise, the ability to switch to standby power mode when optical connector is not plugged in provides power and cooling savings.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. A laser shutdown control mechanism within an optical signal transmission device including an optical transceiver and an optical connector, wherein said optical transceiver includes a laser having a port for placement of at least one optical fiber therein, wherein said optical connector includes at least one optical fiber extending therefrom, wherein said optical connector connects to said optical transceiver in a manner wherein said at least one optical fiber of said optical connector inserts within said port of said laser within said optical transceiver in contact with an interface with said laser, wherein either or both of said port of said laser and said optical connector is in contact with a microprocessor or circuit upon insertion of said optical fiber within said port of said laser, and wherein said microprocessor or circuit includes at least one spring connector therein; wherein upon said contact with said microprocessor or circuit, said at least one spring connector is forced downward sufficiently to allow for a signal to be relayed to said laser to be turned in the "on" position, and wherein upon disengagement of said optical connector from said optical transceiver such that said at least one optical fiber is no longer in contact with said interface with said laser and said at least one spring, connector raises to a point wherein said microprocessor relays a signal to said laser to be turned in the "off" or "standby mode" position.

2. The laser shutdown control mechanism of claim 1 wherein said microprocessor or circuit is contacted with said port of said laser or said optical connector through at least one circuit switch.

3. The laser shutdown control mechanism of claim 1 wherein said microprocessor or circuit is connected to said port of said laser or said optical connector through at least one sensor device.

4. A method of controlling a laser shutdown within an optical transceiver apparatus, said method comprising the laser shut down control mechanism of claim 1.

5. A method of controlling a laser shutdown within an optical transceiver apparatus, said method comprising the laser shut down control mechanism of claim 2.

6. A method of controlling a laser shutdown within an optical transceiver apparatus, said method comprising the laser shut down control mechanism of claim 3.

* * * * *